(12) United States Patent
Nakayama et al.

(10) Patent No.: US 9,625,297 B2
(45) Date of Patent: Apr. 18, 2017

(54) FLOW METER

(71) Applicant: Azbil Kimmon Co., Ltd., Tokyo (JP)

(72) Inventors: Tomoyuki Nakayama, Tokyo (JP); Jun Ishizeki, Tokyo (JP)

(73) Assignee: AZBIL KIMMON CO., LTD., Tokyo (JP)

( * ) Notice: Subject to any disclaimer, the term of this patent is extended or adjusted under 35 U.S.C. 154(b) by 100 days.

(21) Appl. No.: 14/681,260

(22) Filed: Apr. 8, 2015

(65) Prior Publication Data

US 2015/0316403 A1 Nov. 5, 2015

(30) Foreign Application Priority Data

May 2, 2014 (JP) .................................. 2014-095208

(51) Int. Cl.
*G01F 15/14* (2006.01)
*G01F 3/10* (2006.01)
(Continued)

(52) U.S. Cl.
CPC .............. *G01F 3/10* (2013.01); *G01F 15/022* (2013.01); *G01F 15/14* (2013.01); *G01F 3/12* (2013.01); *G01F 15/063* (2013.01); *G01F 15/185* (2013.01)

(58) Field of Classification Search
CPC ....................................................... G01F 15/14
(Continued)

(56) References Cited

U.S. PATENT DOCUMENTS 3,720,106 A * 3/1973 Varga .................... G01F 15/063
73/273
4,393,724 A * 7/1983 Werkmann ................ G01F 1/10
73/861.79
(Continued)

FOREIGN PATENT DOCUMENTS

JP H02-280014 A 11/1990
JP H02280014 * 11/1990 ............... G01F 1/00
(Continued)

OTHER PUBLICATIONS

EP15164761, European Search Report, Eurpoean Patent Office EPO, Sep. 30, 2015, 7 pages.*
(Continued)

*Primary Examiner* — Clayton E Laballe
*Assistant Examiner* — Kevin Butler
(74) *Attorney, Agent, or Firm* — Troutman Sanders LLP

(57) ABSTRACT

A flow meter includes: a measuring portion having rotors and provided on a pair of shafts positioned horizontally; a sensor that measures a pressure and a temperature within a flow path of the measuring portion; a front side panel that supports front side components of the measuring portion; a front cover that covers the front side components of the measuring portion; a main substrate that is installed in the front cover and collects a signal from the sensor; and a counter displaying portion that displays the signal from the sensor outputted from the main substrate. The sensor is assembled in the tip end of a cylindrical sensor case, the sensor case is inserted into the front side panel through an insertion opening formed in the front cover, the sensor is installed within the front cover, and the sensor and the main substrate are connected to each other.

2 Claims, 3 Drawing Sheets

(51) Int. Cl.
 *G01F 15/02* (2006.01)
 *G01F 3/12* (2006.01)
 *G01F 15/06* (2006.01)
 *G01F 15/18* (2006.01)

(58) Field of Classification Search
 USPC .......................................................... 73/273
 See application file for complete search history.

(56) References Cited

U.S. PATENT DOCUMENTS

| | | | | |
|---|---|---|---|---|
| 5,831,176 | A * | 11/1998 | Morgenthale | G01F 1/115 73/861.77 |
| 5,969,267 | A * | 10/1999 | Smith | G01F 15/14 340/615 |
| 6,874,480 | B1 * | 4/2005 | Ismailov | F02M 51/0678 123/494 |
| 8,387,454 | B2 * | 3/2013 | Margalit | G01F 1/06 137/343 |
| 2002/0014224 | A1 * | 2/2002 | Ismailov | F02D 41/40 123/494 |
| 2004/0149028 | A1 * | 8/2004 | Hiss | G01F 15/02 73/273 |
| 2009/0255345 | A1 * | 10/2009 | Gysling | G01F 1/667 73/861.25 |
| 2012/0103086 | A1 * | 5/2012 | Goka | G01F 15/14 73/204.26 |
| 2014/0109665 | A1 * | 4/2014 | Hollenberg | G01F 15/068 73/273 |
| 2014/0230540 | A1 * | 8/2014 | Golzhauser | G01F 15/14 73/273 |
| 2014/0230541 | A1 * | 8/2014 | Herold | G01F 15/14 73/273 |
| 2015/0316403 | A1 * | 11/2015 | Nakayama | G01F 3/10 73/273 |

FOREIGN PATENT DOCUMENTS

| | | | |
|---|---|---|---|
| JP | H04-34316 | 2/1992 | |
| JP | H0434316 | * 2/1992 | ............... G01F 3/10 |

OTHER PUBLICATIONS

Extended European Search Report dated Sep. 30, 2015 issued in corresponding European Patent Application No. 15164761.7.

* cited by examiner

FLOW METER

CROSS REFERENCE TO RELATED APPLICATION

This application claims priority under 35 U.S.C. §119 to Japanese Patent Application No. 2014-095208, filed on May 2, 2014, the entire content of which being hereby incorporated herein by reference.

FIELD OF TECHNOLOGY

The present disclosure relates to a flow meter wherein a sensor for measuring a temperature and pressure within a main unit is provided within a main unit.

BACKGROUND

A conventional flow meter is structured with a housing wherein is formed a flow path that is attached to piping above and below, through which a fluid that is to be measured flows, to form a flow path that is connected to an enclosing portion in the center of a main unit, and a flow meter unit that is attached removably to this housing. The flow meter unit is structured from a measuring portion, enclosed within the enclosed portion, that has a rotor that rotates in accordance with the flow rate of the fluid, and a detecting portion for detecting the speed of rotation of the rotor. See, for example, Japanese Unexamined Patent Application Publication H4-34316 ("the JP '316"). Moreover, while not illustrated in the details in the JP '316, typically, in the flow meter, no sensor for measuring the temperature and pressure within the main unit is provided within the main unit, so a sensor is screwed into a boss, which is provided on the main unit, so as to be installed separately, outside of the main unit. Moreover, copper wires (communicating wires) for connecting between the sensor and a counter portion are exposed on the outside.

However, in the conventional technology it is necessary to install a separate sensor, through screwing in, or the like, on the outside of the main unit, and thus the structure is one wherein the communication lines of the sensor for measuring the temperature and pressure are exposed on the outside of the main unit, not only having a deleterious impact on the appearance of the flow meter, but also having a problem in that there is a strong possibility that the wires could get pulled out or have conductivity faults.

The present invention was created in order to solve issues such as the above, and an aspect thereof is to provide a flow meter wherein the sensor for measuring the temperature and the pressure, and the communication lines, are installed within a case, thereby maintaining the actual appearance of the flow meter and preventing the sensor and wires from being pulled off.

SUMMARY

A flow meter according to the present invention includes: a measuring portion, which forms a flow path through which a fluid flows, having rotors that rotate in accordance with a flow rate of the fluid, provided on a pair of shafts that are positioned horizontally; a sensor that measures a pressure and a temperature within the flow path of the measuring portion; a front side panel that supports front side components of the measuring portion from outside of the measuring portion; a front cover that covers the front side components of the measuring portion, from outside of the front side panel, and forms a case that encloses electric components; a main substrate that is installed in the front cover and collects a signal from the sensor; a counter displaying portion that displays a signal from the sensor, outputted from the main substrate; and a counter case that is arranged so as to cover the main substrate and provided in the front cover. The sensor is assembled in the tip end of a cylindrical sensor case. The sensor case is inserted into the front side panel through an insertion opening that is formed in the front cover. The sensor is installed within the front cover. The sensor and the main substrate are connected.

In the present invention structured as described above the communication lines of the sensor for measuring the temperature and the pressure are installed within a case, thereby preventing the sensor and wires from being pulled off.

BRIEF DESCRIPTIONS OF THE DRAWINGS

Figure 3:
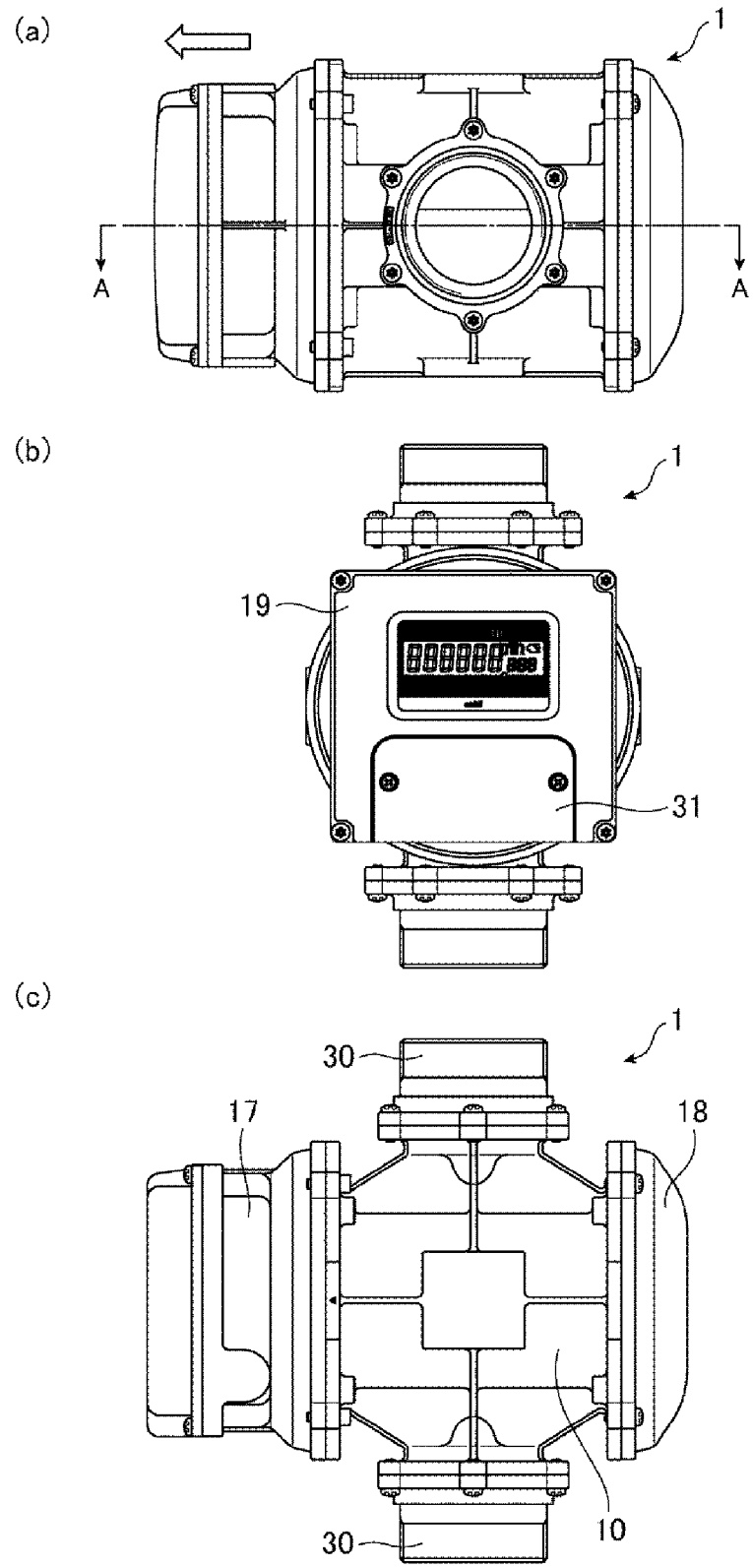

FIGS. 3(*a*)-(*c*) are each an external appearance diagram of the flow meter related to the example.

DETAILED DESCRIPTION

An example according to the present disclosure will be explained in detail below referencing the figures.

Figure 1:
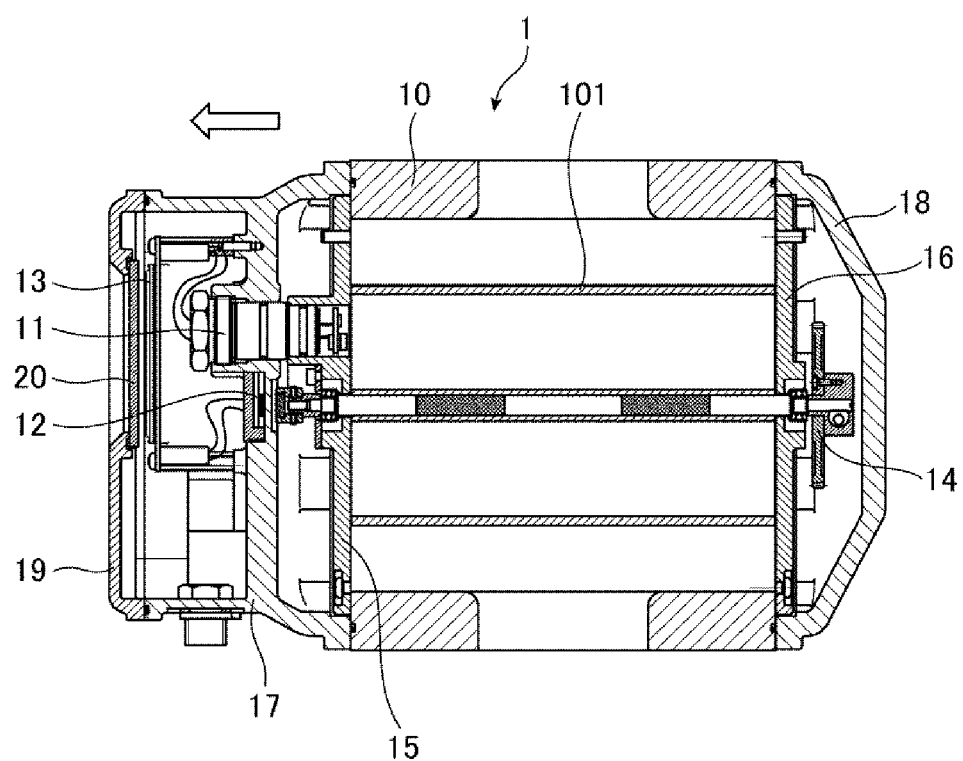
FIG. 1 is a cross-sectional diagram of a flow meter according to an example according to the present invention.

FIG. 1 is a cross-sectional diagram of a flow meter 1 according to the example according to the present invention.

Note that FIG. 1 is a vertical sectional diagram when the flow meter 1 is viewed from the left side, where the direction indicated by the arrow in FIG. 1 is the front.

As illustrated in FIG. 1, the flow meter 1 is provided with a measuring portion 10, a temperature/pressure sensor 11, an MR sensor 12, a main substrate 13, and a rotor gear 14.

The measuring portion 10 contains two rotors 101 for measuring the flow rate of the fluid that is subject to measurement, which flows therein. Note that the measuring portion 10 may be connected using bolts to a piping flange (not shown), or connected through another connecting method.

The rotors 101 use two gourd-shaped rotating bodies in a single pair, and are provided with a pair of shafts that are positioned horizontally, to rotate in accordance with the flow rate of the fluid. Note that while here the rotors 101 were gourd shaped, there is no limit thereto, but rather may be eyebrow shaped, or another shaped instead.

The temperature/pressure sensor 11 has a sensor 111 provided on the tip end thereof, and measures the temperature and pressure within the measuring portion 10 using the sensor 111. As illustrated in FIG. 1, the temperature/pressure sensor 11 is installed through insertion into a front side panel 15 through an insertion opening that is formed in a front cover 17 (which will be described in detail below).

The MR sensor 12 reads in the magnetic force of a magnet that is disposed on the tip end of the shaft for the rotor 101, to outputs a signal.

A main substrate 13 collects the signals from the MR sensor 12 and the temperature/pressure sensor 11, and performs a volume calculation. Moreover, it outputs the signals collected from the MR sensor 12 and the temperature/pressure sensor 11.

The rotor gears 14 are gears for synchronizing the rotational periods so that the rotors 101 do not interfere with each other.

A counter displaying portion 20 displays the signals outputted by the main substrate 13.

As illustrated in FIG. 1, the temperature/pressure sensor 11 and the front side rotating parts of the measuring portion 10 are supported on the front side panel 15, and the back side rotating parts of the measuring portion 10 are supported by the back side panel 16.

Moreover, the front cover 17 covers the front side panel 15, the temperature/pressure sensor 11, and the parts that are on the front side of the measuring portion 10, such as magnets, and the like, from further to the outside then the front side panel 15. Moreover, the front cover 17 also serves as a case wherein electronic components (the main substrate 13, the MR sensor 12, batteries, and the like) are disposed.

Furthermore, a back cover 18 covers the back side panel 16 and parts that are on the back side of the measuring portion 10, such as the rotor gears 14, and the like, from further to the outside then the back side panel 16.

A counter case 19 is disposed so as to cover the front cover 17, and is provided in order to protect the main substrate 13, the MR sensor 12, and the temperatures/pressure sensor 11 that are disposed within the front cover 17.

Figure 2:
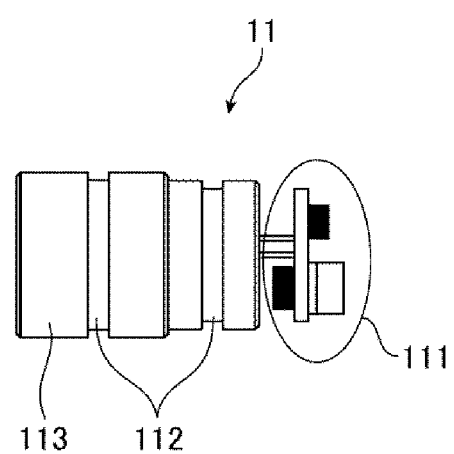
FIG. 2 is an external appearance diagram of the flow meter according to the example.

FIG. 2 is an external appearance diagram of the temperature/pressure sensor 11 of the flow meter according to the example.

The structure of the temperature/pressure sensor 11 will be explained in detail using FIG. 2.

The temperature/pressure sensor 11 is, as illustrated in FIG. 2, structured from a sensor 111 and a sensor case 113, where the sensor case 113 has grooves 112 in two locations.

The sensor 111 is mounted on a substrate and assembled into the cylindrical sensor case 113, to measure the temperature and pressure within the measuring portion 10. Moreover, the sensor 111 and the main substrate 13 are connected together by copper wires, and the like, where the securing of the sensor 111 uses a nut that has a hole in the center thereof (referencing FIG. 1).

As described above, the temperature/pressure sensor 11 is installed through insertion through an insertion opening that is formed in the front cover 17 Into the front side panel 15, and it is possible to avoid interference between the sensor 111 and the rotors 101 by having the outer cylinder of the sensor case 113 that is inserted into the front side panel 15 push against the boss tip end of the front side panel 15. That is, in the depth direction, the sensor case 113 makes contact with the boss tip end of the front side panel 15, in a system wherein the sensor case is not inserted further, so the depth of insertion of the sensor case 113 that is inserted into the front side panel 15 is determined thereby, making it possible to prevent interference between the sensor 111 and the rotors 101.

Moreover, respective O-rings are fitted into two grooves 112 in the sensor case 113. This makes it possible to ensure airtightness between the sensor case 113 and the interior of front cover 17 and between the sensor case 113 and the measuring portion 10 of the front side panel 15.

Specifically, of the two O-rings, one O-ring (having an O-ring diameter that is small), which is fitted into the measuring portion 10 side, can maintain airtightness between the sensor case 113 and the front side panel 15. At this time, this is able to prevent fluid from leaking, to prevent negative effects on performance through fluid flowing into the front cover 17, and to prevent the mixing with fluid of the front cover 17 making it impossible to measure the temperature and pressure of the liquid within the piping accurately.

Additionally, of the O-rings in the two locations, the O-ring (having a large O-ring diameter), which is fitted into the main substrate 13, is able to ensure airtightness between the sensor case 113 and the interior of the front cover 17 (the part into which the counter case 19 and the main substrate 13 are inserted). That is, this makes it possible to isolate the gas environment through a partitioning wall portion of the front cover 17.

FIG. 3 is an external view of a flow meter 1 according to the example according to the present invention. In FIG. 3, identical codes are assigned to structures that are identical to those explained using FIG. 1, and redundant explanations are omitted.

Note that in FIG. 3 (*a*) the direction indicated by the arrow is the front, where the vertical sectional diagram along the line A-A in FIG. 3 (*a*) is FIG. 1.

FIG. 3 (*a*) is an external view when viewed from above, FIG. 3 (*b*) is an external view when viewed from the front, and FIG. 3 (*c*) is an external view when viewed from the right side face.

In FIG. 3, the flow meter 1 is provided with a replaceable socket flange 30 in the form of a piping flange. Moreover, the counter case 19 is provided with a terminal block cover 31. Note that the structure need not necessarily be provided with a terminal block cover 31.

Moreover, while FIG. 3 is external views of the case of vertical piping, there is no limitation thereto, but the piping may instead be horizontal.

Moreover, in this way this example enables the prevention of damage such as parts being pulled off or pulled out, while maintaining the actual appearance of the flow meter 1, because the wiring for the sensor 111 that measures the temperature and pressure is built into the interior of the front cover 17 and the counter case 19. Moreover, this can reduce damage or injuries that are caused through the copper wiring of the sensor 111 coming into contact with the body or clothing of a worker.

Moreover, fitting of the respective O-rings into the grooves 112 in the two locations of the sensor case 113 makes it possible to secure airtightness between the sensor case 113 and the interior of the front cover 17 and airtightness between the sensor case 113 and the interior of the measuring portion 10 of the front side plate 15.

Furthermore, the insertion depth of the sensor case 113, which is inserted into the front side panel 15 being determined by contacting the front side panel 15 makes it possible to prevent interference between the sensor 111 and the rotors 101.

Note that in the invention in the present application, arbitrary structural elements in the example may be modified, or arbitrary structural elements in the example may be omitted, within the scope of the invention.

The invention claimed is:
1. A flow meter comprising:
   a measuring portion, which forms a flow path through which a fluid flows, having rotors that rotate in accordance with a flow rate of the fluid, provided on a pair of shafts that are positioned horizontally;
   a sensor that measures a pressure and a temperature within the flow path of the measuring portion;
   a front side panel that supports front side components of the measuring portion from outside of the measuring portion;
   a front cover that covers the front side components of the measuring portion, from outside of the front side panel, and forms a case that encloses electric components;

a main substrate that is installed in the front cover and collects a signal from the sensor;

a counter displaying portion that displays a signal from the sensor, outputted from the main substrate; and a counter case that is arranged so as to cover the main substrate and provided in the front cover; wherein:

the sensor is assembled in the tip end of a cylindrical sensor case, the sensor case is inserted into the front side panel through an insertion opening that is formed in the front cover, the sensor is installed within the front cover, and the sensor and the main substrate are connected.

2. The flow meter as set forth in claim 1, wherein:

the sensor case has two grooves, and O-rings are fitted into each of the grooves.

* * * * *